(12) United States Patent
Potakowskyj et al.

(10) Patent No.: US 10,935,787 B2
(45) Date of Patent: Mar. 2, 2021

(54) COMBINER POSITIONING SYSTEM

(71) Applicant: Jabil Inc., St. Petersburg, FL (US)

(72) Inventors: Christoph Potakowskyj, Vienna (AT); Martin Haupt, Vienna (AT); Johannes Zeleny, Gumpoldskirchen (AT); Gottfried Hack, Neulengbach (AT); Roman Jiricka, Vienna (AT)

(73) Assignee: Jabil Inc., St. Petersburg, FL (US)

(*) Notice: Subject to any disclaimer, the term of this patent is extended or adjusted under 35 U.S.C. 154(b) by 111 days.

(21) Appl. No.: 16/239,936

(22) Filed: Jan. 4, 2019

(65) Prior Publication Data
US 2019/0212559 A1    Jul. 11, 2019

(30) Foreign Application Priority Data
Jan. 5, 2018 (EP) .................................... 18150414

(51) Int. Cl.
*G02B 27/01* (2006.01)
*B60K 35/00* (2006.01)

(52) U.S. Cl.
CPC ..... *G02B 27/0149* (2013.01); *G02B 27/0179* (2013.01); *B60K 35/00* (2013.01); *B60K 2370/334* (2019.05); *B60K 2370/67* (2019.05); *G02B 2027/0154* (2013.01); *G02B 2027/0159* (2013.01)

(58) Field of Classification Search
CPC ............ G02B 27/0149; G02B 27/0179; G02B 2027/0154; G02B 2027/0159; G02B 27/01; G02B 27/0101; G02B 27/017; G02B 27/0172; G02B 27/0176; B60K 2370/67; B60K 2370/334; B60K 35/00; H04N 13/044; H04N 5/7491

USPC .... 359/13–14, 237–238, 290–296, 629–640; 345/7–9; 348/115; 349/11
See application file for complete search history.

(56) References Cited

U.S. PATENT DOCUMENTS

| | | | |
|---|---|---|---|
| 5,905,477 A * | 5/1999 | Kuwayama | B60K 35/00 345/7 |
| 9,116,339 B2 | 8/2015 | Ruyten | |
| 9,939,641 B1 * | 4/2018 | Quiroz de la mora | G02B 27/0149 |
| 2013/0100535 A1 * | 4/2013 | Ruyten | B60R 11/0229 359/632 |

(Continued)

FOREIGN PATENT DOCUMENTS

EP            1036692 A1 *   9/2000   ............ B60K 35/00

*Primary Examiner* — William R Alexander
*Assistant Examiner* — Alberto J Betancourt
(74) *Attorney, Agent, or Firm* — Young Basile Hanlon & MacFarlane, P.C.

(57) ABSTRACT

A combiner positioning system for a head-up display, the system including a combiner for the head-up display, where the combiner is movable between a stowed position and a display position, positioning means built to move the combiner from the stowed position into the display position, and actuation means built to disengage locking means. The positioning means includes spring means built to move the combiner from the stowed position into the display position by means of a spring force in case the locking means are disengaged, and the combiner is built to be moved manually from the display position into the stowed position, where in the stowed position the combiner is built to lock into place by engaging the locking means.

18 Claims, 7 Drawing Sheets

(56) References Cited

U.S. PATENT DOCUMENTS

| | | | |
|---|---|---|---|
| 2013/0186105 A1* | 7/2013 | Meacham | F16F 15/023 60/797 |
| 2015/0116804 A1* | 4/2015 | Mizoguchi | G02B 27/0149 359/199.3 |
| 2017/0082857 A1* | 3/2017 | Schoch | G02B 27/0149 |
| 2017/0113631 A1* | 4/2017 | Gnielka | B60K 35/00 |
| 2017/0254366 A1* | 9/2017 | Antchak | F16H 55/36 |
| 2017/0329101 A1* | 11/2017 | Chen | G02B 27/0149 |
| 2018/0045959 A1* | 2/2018 | Nakayama | G02B 27/0149 |
| 2018/0201204 A1* | 7/2018 | Saitou | G02B 27/01 |

\* cited by examiner

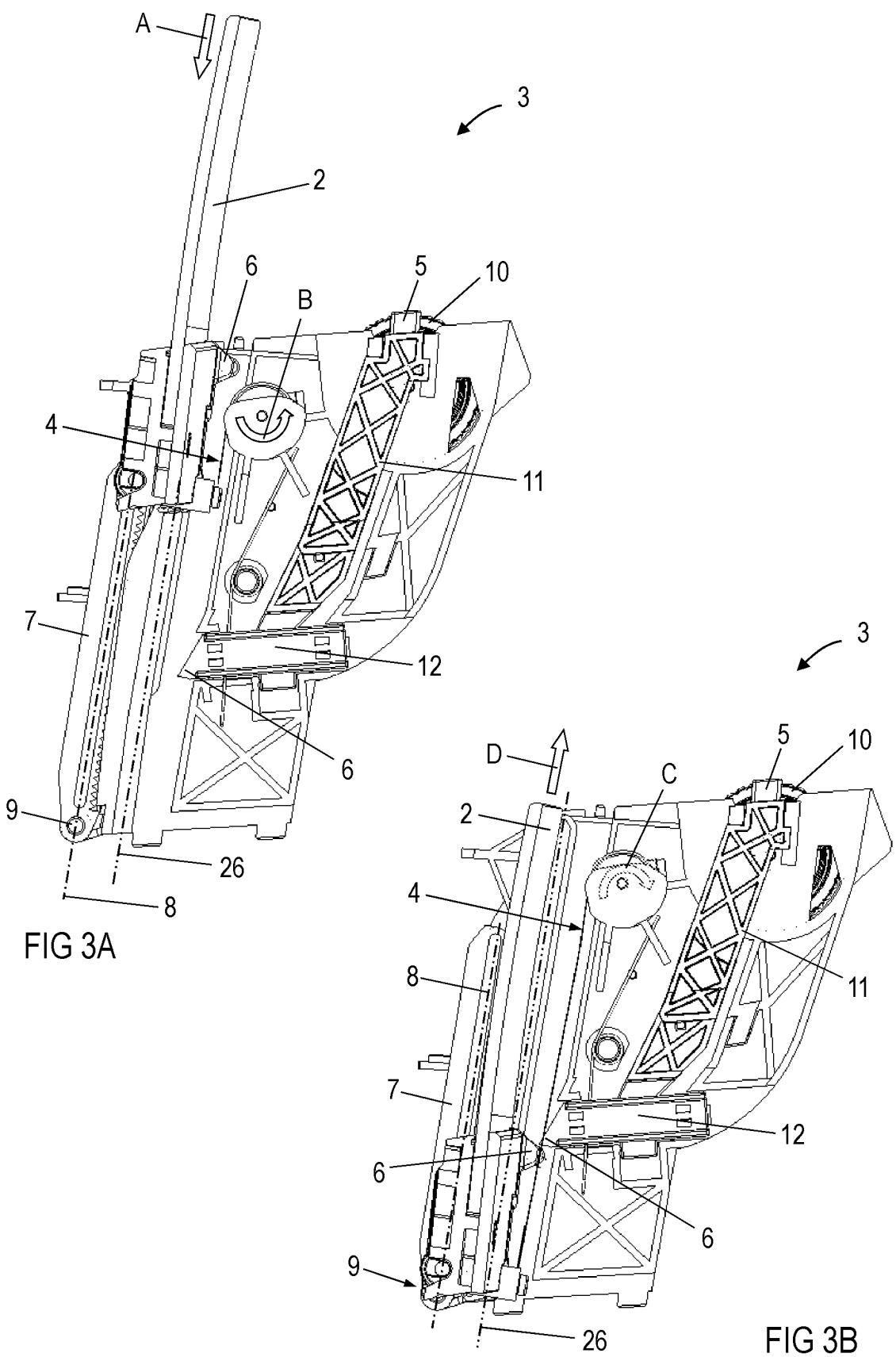

COMBINER POSITIONING SYSTEM

CROSS-REFERENCE TO RELATED APPLICATION

This application claims priority to and the benefit of European Patent Application No. 18150414.3 filed Jan. 5, 2018, the entire disclosure of which is hereby incorporated by reference.

TECHNICAL FIELD

This disclosure relates to a combiner positioning system for a head-up display.

BACKGROUND

Head-up displays (HUDs) are used to provide information to a driver of a vehicle, such as for instance speed, fuel consumption, traffic and navigation information, while allowing the driver to keep his view on the road. Basically, a HUD includes a combiner, a projector, and a visual data source, wherein the combiner may be a translucent panel upon which the visual data is projected. HUDs require careful design considerations to install them in reduced available space and to ensure reliable performance under varying and harsh environmental conditions, such as high humidity, extreme temperatures, and the presence of contaminants causing corrosion.

Due to above reasons, it appears desirable to store and/or protect the combiner when the HUD system is inactive. U.S. Pat. No. 9,116,339 B2 discloses a positioning system for a HUD, which positioning system is driven by a motor to rotate the combiner between a stowed position and a display position, wherein a locking element holds the combiner in the display position. This system, such as similar systems known in the art, has the disadvantage that, amongst others, the drive of the positioning system is vulnerable to above given varying environmental conditions. For example, the electricity of the drive may be attacked by corrosion and/or break down by any other known defect, such as an interrupted energy supply. In addition, users often unconsciously try to manually push back the combiner into the stowed position leading to a mechanical breakdown of the positioning system.

SUMMARY

The objective of the disclosure is to provide an alternative combiner positioning system for a head up-display that overcomes the disadvantages known in the art. Disclosed is a combiner positioning system for a head-up display, which system comprises a combiner for the head-up display, wherein the combiner is movable between a stowed position and a display position, positioning means built to move the combiner from the stowed position into the display position, and actuation means built to disengage locking means. Moreover, the disclosure concerns a head-up display, in particular for installation in a car, comprising such a combiner positioning system.

In accordance with the present disclosure, there is provided a combiner positioning system for a head up-display with positioning means that comprise spring means built to move the combiner from the stowed position into the display position by means of a spring force in case the locking means are disengaged, and that the combiner is built to be moved manually from the display position into the stowed position, wherein in the stowed position the combiner is built to lock into place by engaging the locking means.

The combiner positioning system according to the disclosure has the advantage that it is driven solely by the spring means or with the manual/finger force of a user, without any additional, especially without any electrical, drive means. Thus, the system is very easy to construct, reliable and robust against varying and harsh environmental conditions. In addition, the system provides a direct haptic feedback to a user and is invulnerable against an unconscious manual push of the user to bring the combiner back into the stowed position.

In a preferred embodiment of the disclosure, the positioning means comprise a linear guidance, wherein the combiner is moved along a length axis of the linear guidance of the system. Thus, the positioning means and accordingly the HUD system according to the disclosure can be constructed in a space-saving way, and the linear guidance of the combiner improves the operability.

In a preferred embodiment of the disclosure, the linear guidance and its length axis are built to be pivoted about a hinge axis arranged at a first end of the linear guidance. Thus, the pivot angle of the linear guidance and accordingly the viewing angle of the combiner can be adjusted. Preferably, a pivot angle of the linear guidance is adjustable via manual adjustment means, in particular comprising an adjustment wheel. Thus, the viewing angle of the combiner can be adjusted manually.

In a preferred embodiment of the disclosure, the adjustment means comprise an eccentric camwheel, wherein the linear guidance is built to be pivoted by means of the camwheel and a first pin attached to a carrier of the combiner and guided in the linear guidance, wherein rotation of the camwheel moves the first pin in an essentially orthogonal direction as compared to the length axis of the linear guidance. Preferably, the system further comprises pressure springs built to press the linear guidance to the camwheel. Thus, undesirable vibrations are reduced.

In a preferred embodiment of the disclosure, the adjustment of the linear guidance remains constant during the movement of the combiner between the stowed position and the display position. Thus, the viewing angle of the combiner stays constant and does not need to be re-adjusted.

In a preferred embodiment of the disclosure, the positioning means comprise a damper, in particular a silicon oil damper, built to damp the movement of the spring means. Preferably, the positioning means comprise a coupling element, in particular a wrap spring clutch, built to couple/decouple the damper to/from the spring means. Thus, the movement from the stowed position into the display position may be damped, wherein the movement from the display position into the stowed position is not damped.

In a preferred embodiment of the disclosure, the spring means are realized by at least one constant force spring. Thus, the movement of the combiner between the stowed position and the display position can be provided in a constant and uniform way.

In addition, in accordance with the present disclosure, there is provided a head-up display, in particular for installation in a car, comprising a combiner positioning system according to any of the above given embodiments.

BRIEF DESCRIPTION OF THE DRAWINGS

Further details and advantages of the combiner positioning system according to the disclosure will become more apparent in the following description and the accompanying drawings. In the drawings:

FIGS. 3A and 3B show in a side view a positioning system of the HUD system as shown in FIG. 1 cut along its middle plane, wherein in FIGS. 3A and 3B the combiner is in the display position and the stowed position, respectively.

DETAILED DESCRIPTION

Figure 1:
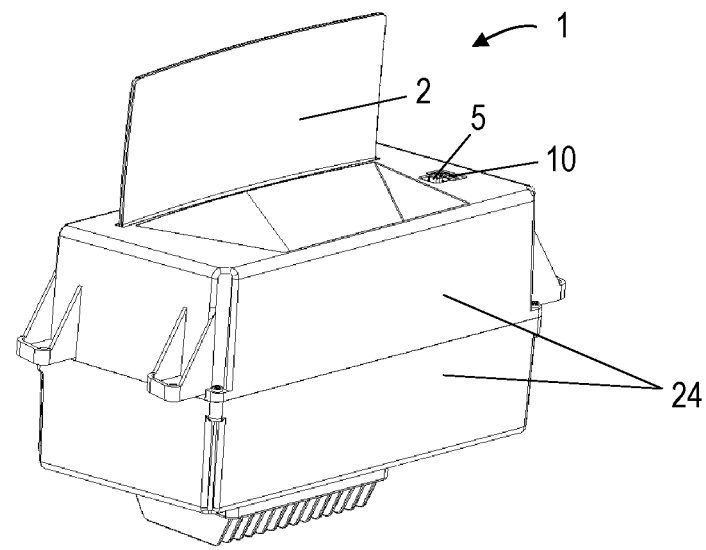
FIG. 1 shows in a perspective rear view from left above a HUD system according to a first embodiment of the disclosure.
Figure 2A:
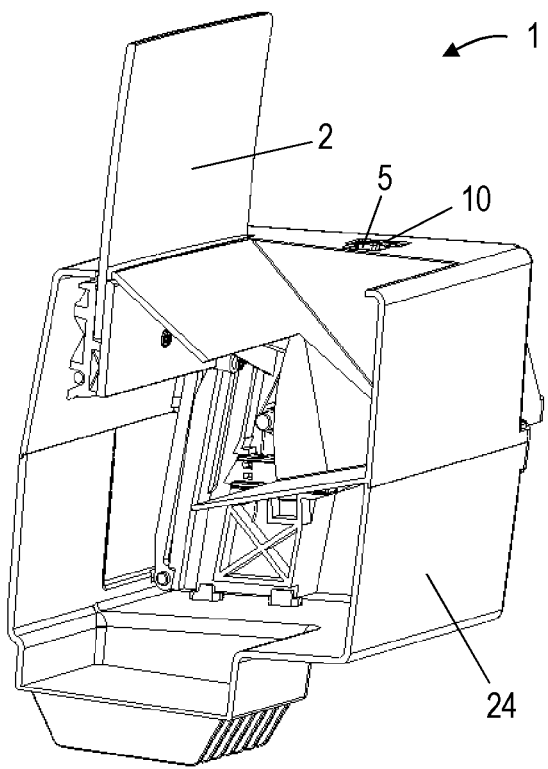
FIGS. 2A and 2B show a section of the HUD system as shown in FIG. 1 cut along its middle plane, wherein in FIGS. 2A and 2B a combiner from the HUD system is in the display position and the stowed position, respectively.
Figure 2B:
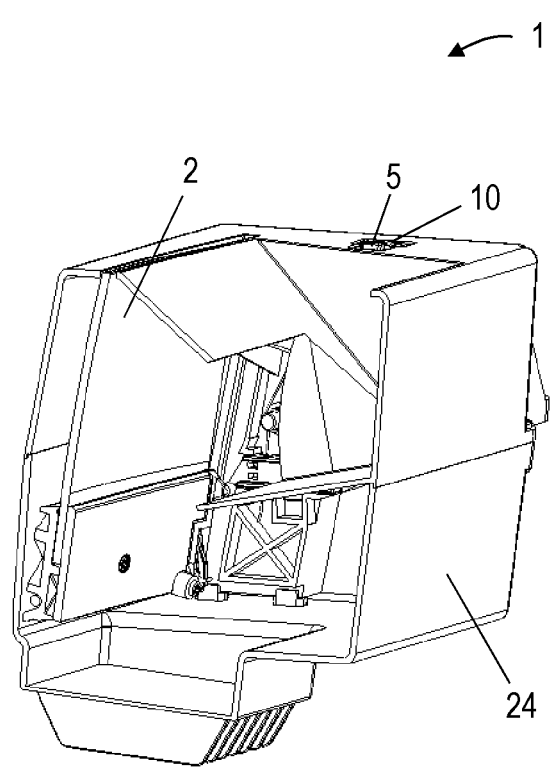

FIGS. 1 to 2B show a HUD system 1 according to a first exemplary embodiment of the disclosure. The HUD system 1 comprises a combiner 2, a projector (not shown) and a visual data source (not shown). The combiner 2 is part of a combiner positioning system 3 (see FIGS. 3A and 3B), which is built to move the combiner 2 between a stowed position, as shown in FIG. 2B, and a display position, as shown in FIG. 2A. In the stowed position, the combiner 2 is stowed within a casing 24 of the HUD system 1, which can for example be integrated into a dashboard of a vehicle.

FIGS. 3A to 9B show the combiner positioning system 3 according to the first embodiment of the disclosure. The combiner positioning system 3 comprises positioning means. The positioning means comprise spring means 4 built to move the combiner 2 from a stowed position into a display position by means of a spring force. The combiner positioning system 3 further comprises actuation means, which in the given example are realized by a mechanical button 5, a first lever 11 and a second lever 12. The actuation means are built to disengage locking means 6 of the combiner positioning system 3.

Figure 4A:
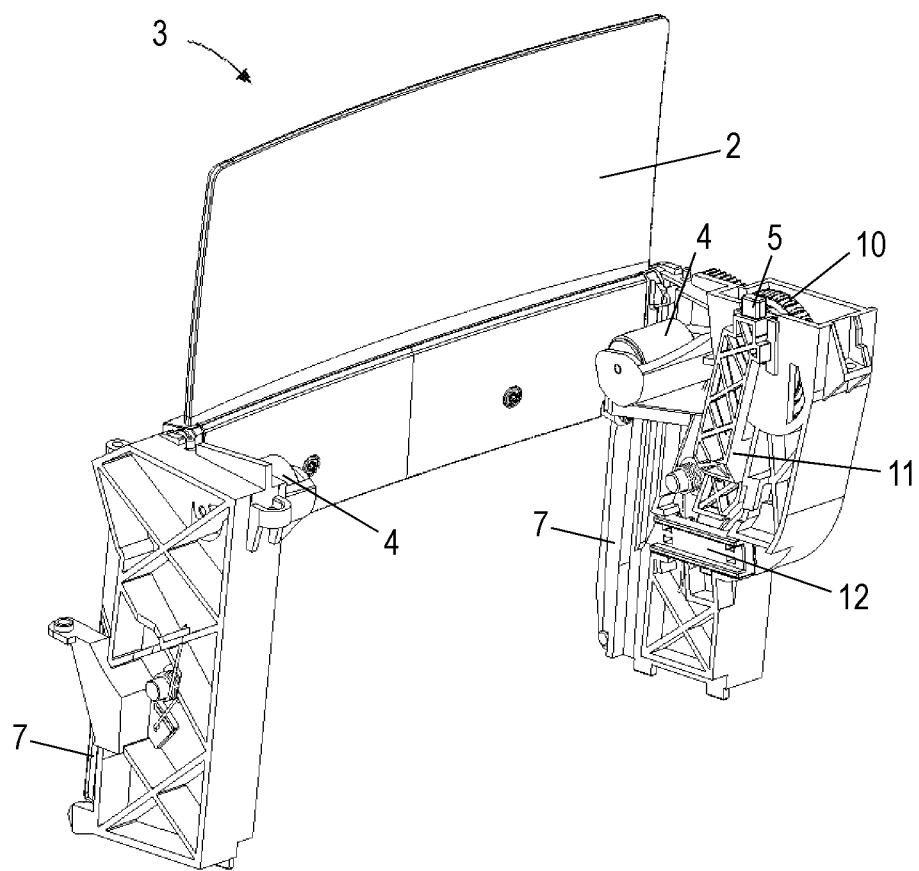
FIGS. 4A and 4B show in a perspective rear view from left above the positioning system as shown in FIGS. 3A and 3B, respectively.
Figure 4B:
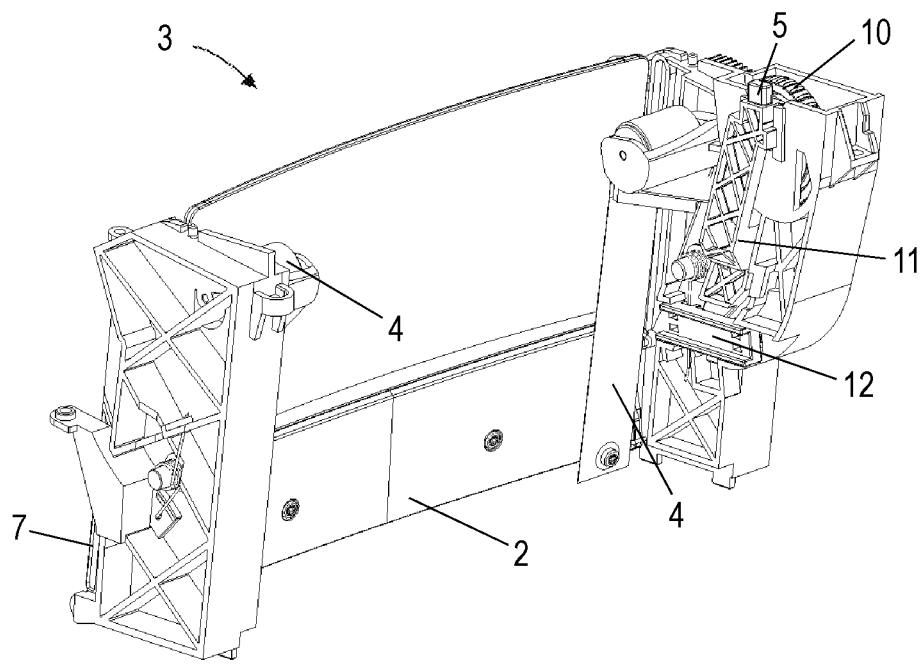
Figure 5A:
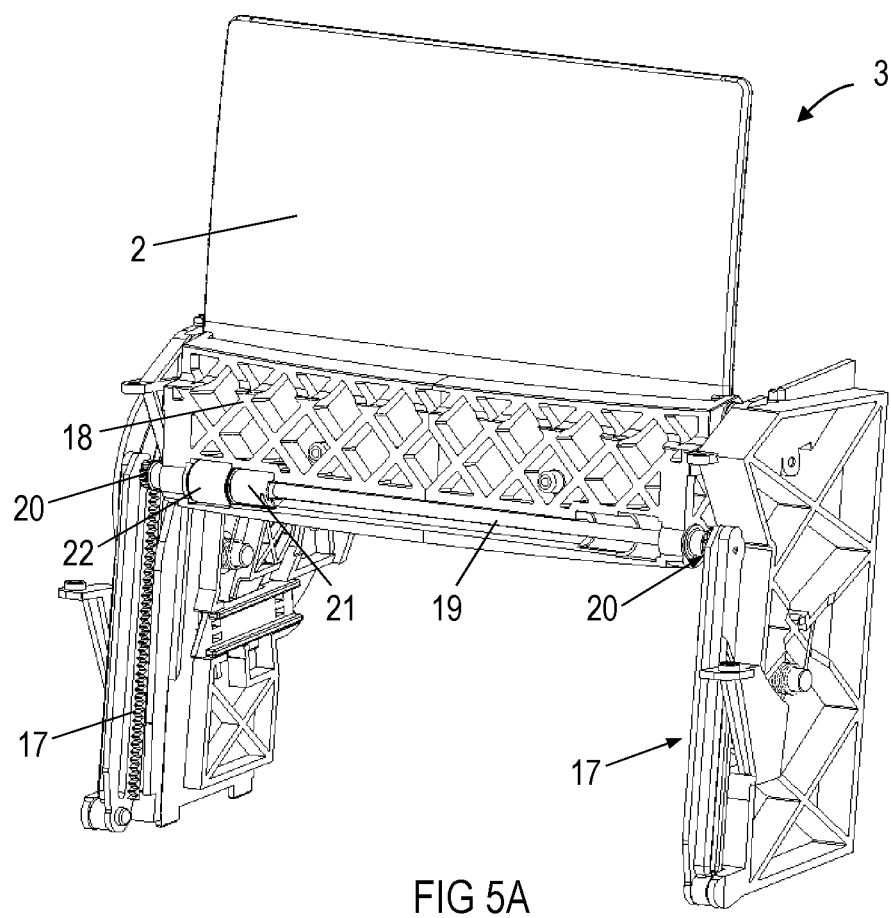
FIGS. 5A and 5B show in a perspective front view from right above the positioning system as shown in FIGS. 3A and 3B, respectively.
Figure 5B:
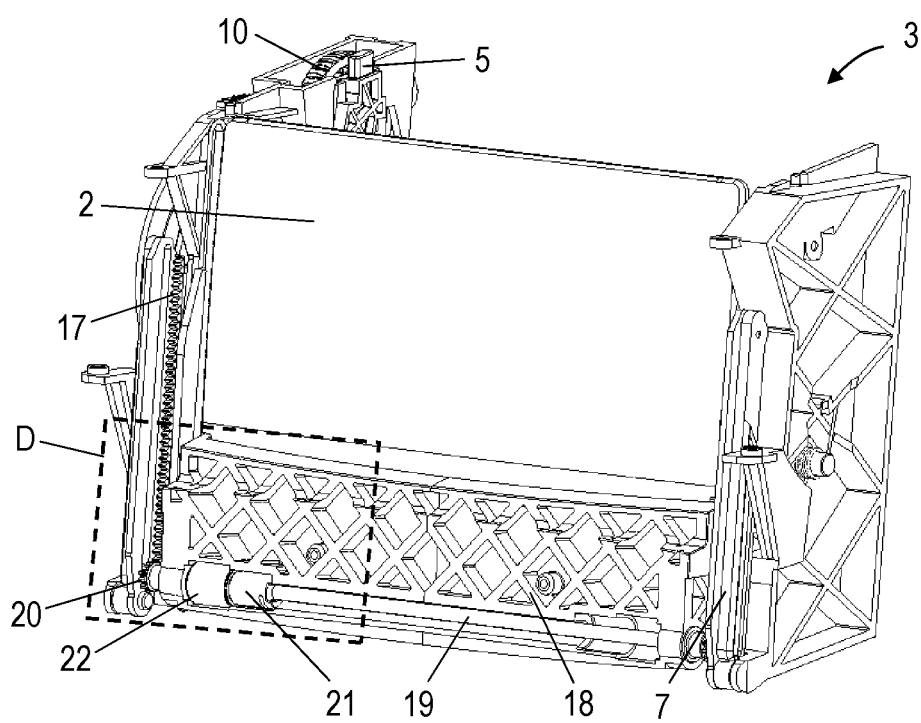
Figure 6:
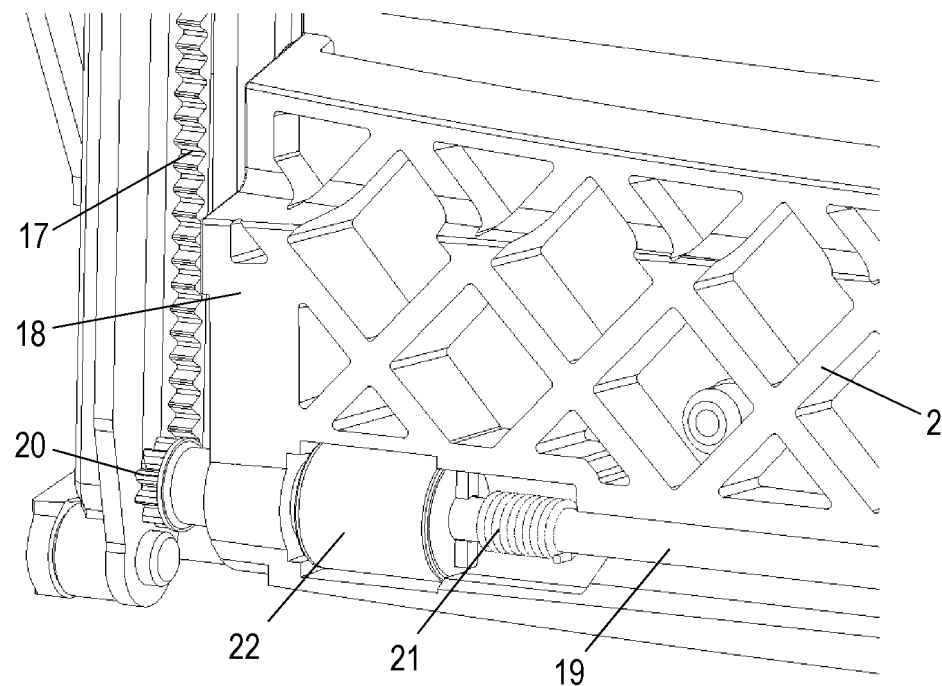
FIG. 6 shows detail D from FIG. 5B.
Figure 7:
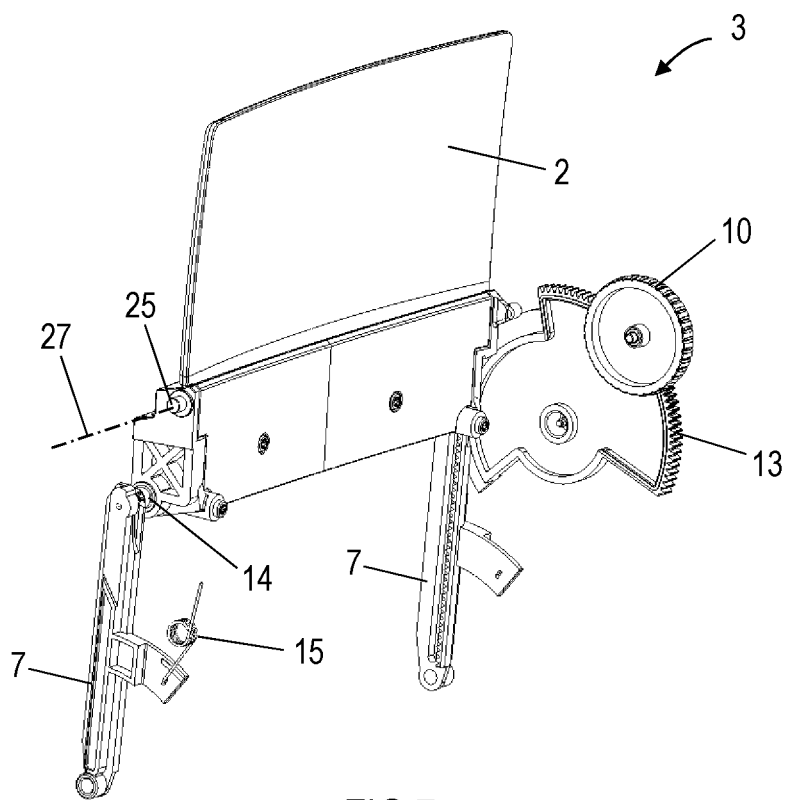
FIG. 7 shows a part of the positioning system as shown in FIG. 4A.

The spring means 4 can be realized as at least one constant force spring, as shown in FIGS. 4A and 4B, which are commercially available, for example from Lesjöfors AB. A constant force spring is advantageous for a linear movement and produces an essentially constant force throughout its deflection. Other springs, such as extension springs may be used as the spring means 4. Furthermore, the spring means 4 could be realized by two or more constant force springs as well.

If a user manually pushes the combiner 2 from its display position along direction A and against the spring force of the spring means 4, for example by his finger force, as indicated in FIG. 3A, then the combiner 2 is moved towards the stowed position, wherein the spring means 4 are unwound along direction B.

In the stowed position of the combiner 2, as indicated in FIG. 3B, the spring means 4 are unwound as fully as possible and thus, the maximum spring force is "charged" within the spring means 4. The spring means 4 are held back by the locking means 6 and, thus, the combiner 2 is locked into place. If a user manually pushes the mechanical button 5, then the first lever 11 retracts the second lever 12 and the locking means 6 are disengaged. Accordingly, the spring means 4 upwind themselves along direction C by means of the charged spring force and move the combiner 2 from the stowed position into the display position along direction D.

In the exemplary first embodiment of the disclosure, the positioning means comprise a linear guidance 7. The linear guidance 7 comprises two gear racks 17, one on each lateral side of the combiner 2; see also FIGS. 5A to 6. The combiner 2 comprises a carrier 18 in its lower section, which carrier 18 is attached to a support shaft 19. The support shaft 19 forms a synchronous axle connecting two gear wheels 20 arranged at first pins 14 of the ends of the support shaft 19. The gear wheels 20 engage with the gear racks 17 to move the combiner 2 along a length axis 8 of the linear guidance 7, thereby guaranteeing a linear extension of the combiner 2. The combiner 2 comprises at least one, in the given example two, second pins 25; see also FIGS. 7 to 9A. Each second pin 25 is guided along a track 26, which may be formed by the rigid casing 24 of the HUD system 1 or by a rigid support structure inside the casing 24. In the extended display position of the combiner 2, the second pin 25 abuts at a prismatic or wedge-shaped end of the track 26 and, thus, the second pin 25 forms a rotation axis 27 about which a viewing angle 23 of the combiner 2 may be manually adjusted as explained below; see also FIGS. 9A and 9B.

The carrier 18 is attached to the spring means 4 as shown in FIGS. 4A and 4B. If the combiner 2 is moved along the gear racks 17, the shaft 19 rotates about its axis via the two gear wheels 20. The positioning means further comprise a coupling element 21, which may in particular be a wrap spring clutch, and a damper 22, which may in particular be a silicon oil damper. The coupling element 21 and the damper 22 are attached at the support shaft 19. The damper 22 is built to damp the movement of the spring means 4 in order to move the combiner 2 in a homogenous and slow enough manner. If the combiner 2 is moved from the stowed position into the display position, the coupling element 21 couples the damper 22 to the support shaft 19 and the movement of the spring means 4 is damped. If the combiner 2 is moved by a user from the display position into the stowed position, the coupling element 21 de-couples the damper 22 from the support shaft 19 and the combiner 2 can be pushed down in a un-damped manner against the force of the spring means 4.

The linear guidance 7 and its length axis 8 are built to be pivoted about a hinge axis 9 arranged at a first end of the linear guidance 7. Thus, the pivot angle 16 of the linear guidance 7 is adjustable via manual adjustment means, which in the given example are realized by an adjustment wheel 10, an eccentric camwheel 13 engaging with the adjustment wheel 10 and a first pin 14 guided by the camwheel 13, as shown in FIGS. 7 to 9B. The first pin 14 is attached to the lower end of the carrier 18 and at least one spring 15 is used to press the linear guidance 7 to the camwheel 13. As shown in FIG. 9B, a rotation of the adjustment wheel 10 along direction E results in a rotation of the camwheel 13 along direction F. Since the camwheel 13 is eccentric, which means that a first radius r1 of a guidance for the first pin 14 is smaller than a second radius r2 of the guidance for the first pin 14, rotation of the camwheel 13 moves the first pin 14 in an essentially orthogonal direction G as compared to the length axis 8 of the linear guidance 7. In the extended display position of the combiner 2, the second pin 25 forms the rotation axis 27 about which the viewing angle 23 of the combiner 2 is adjusted. The viewing angle 23 is the angle between the combiner 2 in its display position and a vertical line. In FIGS. 9A and 9B a driver looks on/through the combiner 2 from the left side along the viewing direction 28.

Figure 8A:
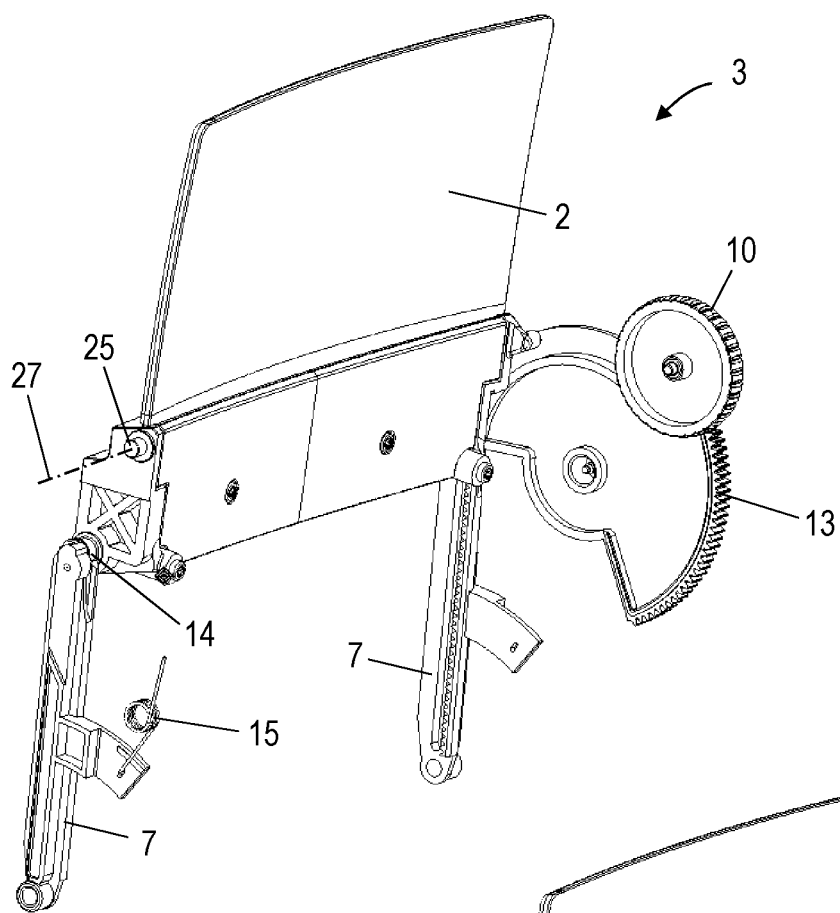
FIGS. 8A and 8B show the positioning system as shown in FIG. 7, wherein in FIGS. 8A and 8B a viewing angle of the combiner is in its minimum upright position for a small driver and in its maximum upright position for a tall driver, respectively.
Figure 8B:
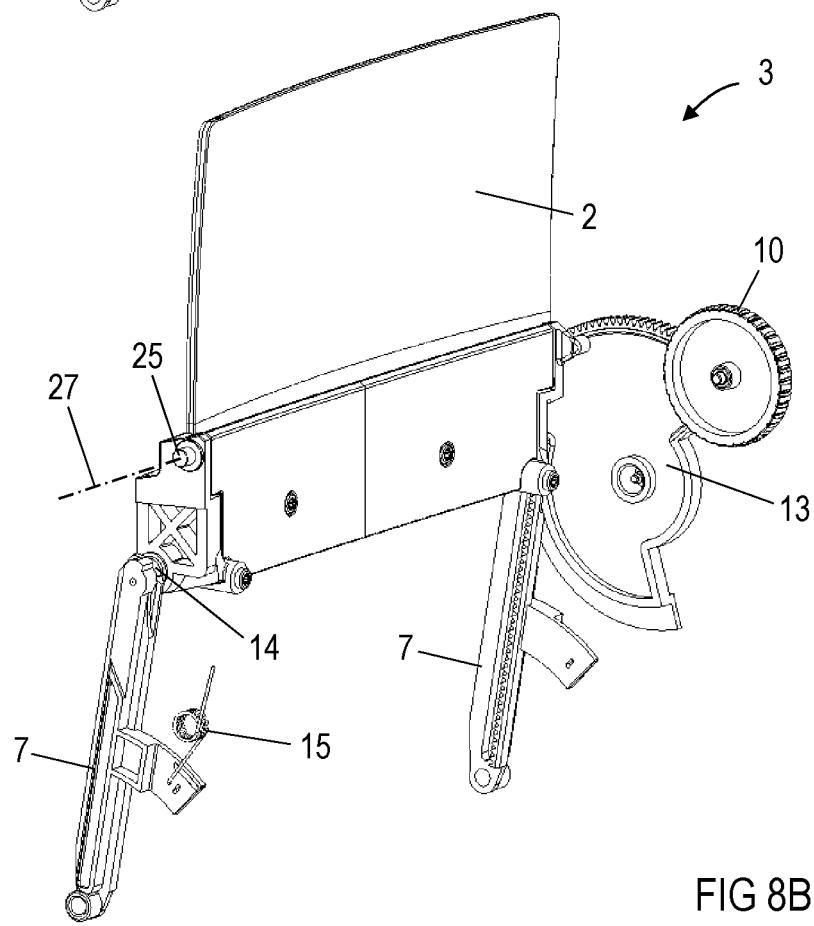
Figure 9A:
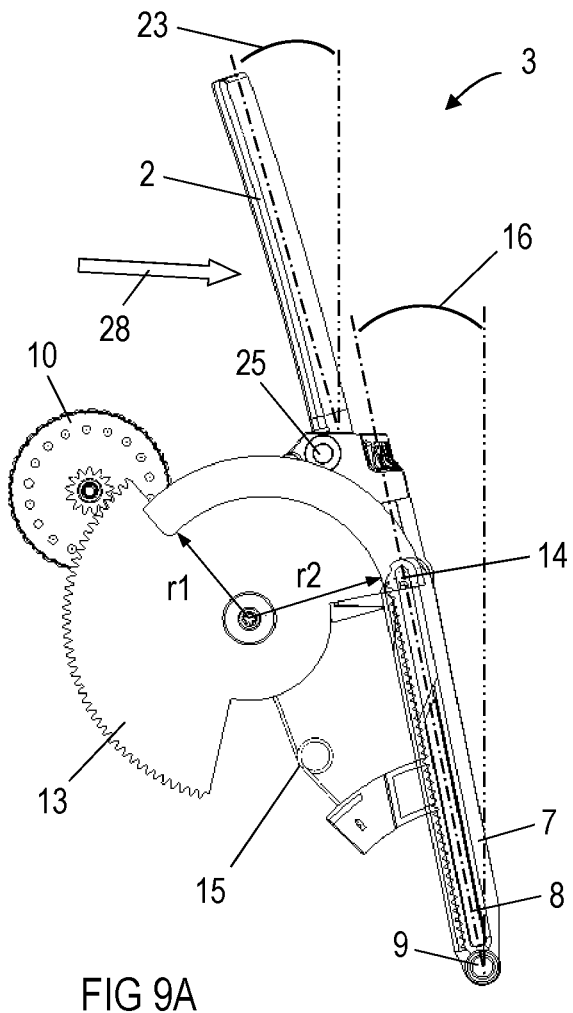
FIGS. 9A and 9B show in a side view the positioning system as shown in FIG. 7 cut along its middle plane, wherein in FIGS. 9A and 9B the viewing angle of the combiner is in its minimum upright position for a small driver and in its maximum upright position for a tall driver, respectively.
Figure 9B:
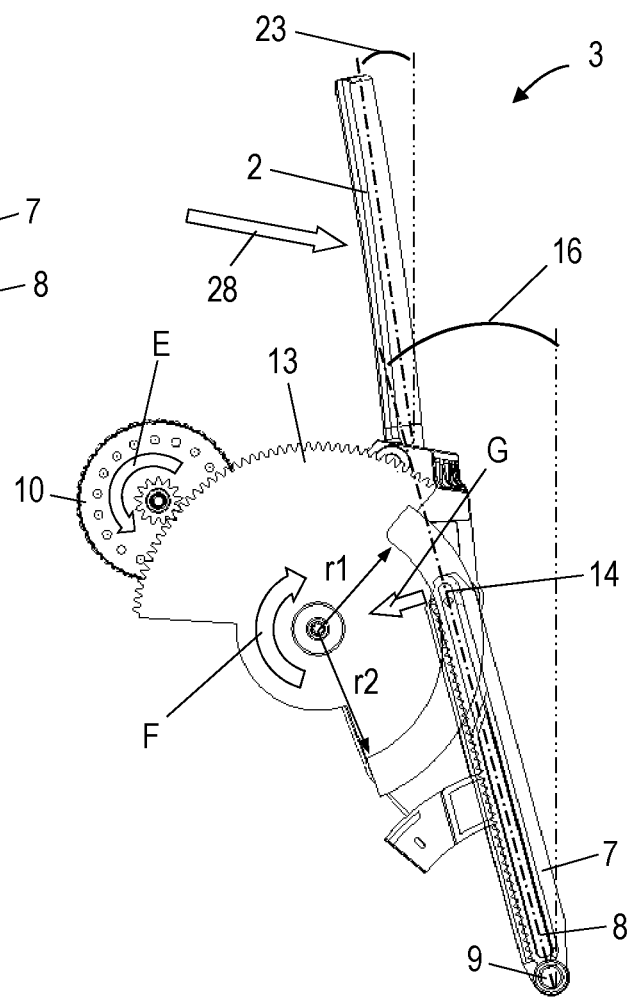

The FIGS. 8A and 9A show the viewing angle 23 of the combiner 2 being in its minimum upright position for a small driver, respectively. The FIGS. 8B and 9B show the viewing angle 23 of the combiner 2 being in its maximum upright position for a tall driver, respectively.

According to the disclosure, the adjustment of the linear guidance 7 and in turn the viewing angle 23 corresponding to the viewing direction 28 remain constant during the movement of the combiner 2 between the stowed position and the display position. This is because the adjustment of pivot angle 16 adjusts the viewing angle 23 since the combiner 2 with its first pin 14 is moved along the linear guidance 7.

The basic concept of the present disclosure was explained by way of one exemplary embodiment. A skilled person knows alternatives to above given solutions to, for example, the mechanical button 5, the locking means 6, the adjustment wheel 10, the first lever 11 and the second lever 12, the camwheel 13, the spring 15, the gear racks 17, the shaft 19, the gear wheels 20, the wrap spring clutch, and the silicon oil damper, which alternatives are comprised by the present disclosure.

It can be mentioned that the positioning system 3 according to the disclosure can be applied to any product that may benefit from such a mechanical/manual positioning system that does not need any additional, especially any electrical, drive means, and which is very easy to construct, reliable and robust against varying and harsh environmental conditions. Such a product may be a video/audio entertainment or a navigation system for a vehicle.

What is claimed is:

1. A combiner positioning system for a head-up display, the system comprising:
    a combiner for the head-up display, wherein the combiner is movable between a stowed position and a display position;
    positioning means built to move the combiner from the stowed position into the display position; and
    actuation means built to disengage locking means,
    wherein the positioning means comprise spring means built to move the combiner from the stowed position into the display position by means of a spring force in case the locking means are disengaged,
    wherein the positioning means comprise a linear guidance with two gear racks, one at each lateral side of the combiner, which combiner is attached to a support shaft connecting two gear wheels arranged at the ends of the support shaft and built to engage with the gear racks to move the combiner along a length axis of the linear guidance,
    wherein the positioning means comprise a damper attached at the support shaft and built to damp the movement of the spring means, and
    wherein the combiner is built to be moved manually from the display position into the stowed position, wherein in the stowed position the combiner is built to lock into place by engaging the locking means.

2. The system according to claim 1, wherein the linear guidance and its length axis are built to be pivoted about a hinge axis arranged at a first end of the linear guidance.

3. The system according to claim 2, wherein a pivot angle of the linear guidance is adjustable via manual adjustment means, in particular comprising an adjustment wheel.

4. The system according to claim 3, wherein the adjustment means comprise an eccentric camwheel, wherein the linear guidance is built to be pivoted by means of the camwheel and a first pin attached to a carrier of the combiner and guided in the linear guidance, wherein rotation of the camwheel moves the first pin in an essentially orthogonal direction (G) as compared to the length axis of the linear guidance.

5. The system according to claim 4, further comprising at least one spring built to press the linear guidance to the camwheel.

6. The system according to claim 5, wherein the adjustment of the linear guidance remains constant during the movement of the combiner between the stowed position and the display position.

7. The system according to claim 6, wherein the positioning means comprise a damper, in particular a silicon oil damper, built to damp the movement of the spring means.

8. The system according to claim 7, wherein the positioning means comprise a coupling element built to couple/decouple the damper to and from the support shaft to enable a damped/un-damped movement of the combiner.

9. The system according to claim 8, wherein the coupling element is a wrap spring clutch.

10. The system according to claim 1, wherein the spring means are realized by at least one constant force spring.

11. A head-up display, comprising:
    a combiner for the head-up display, wherein the combiner is movable between a stowed position and a display position;
    positioning means built to move the combiner from the stowed position into the display position; and
    actuation means built to disengage locking means,
    wherein the positioning means comprise spring means built to move the combiner from the stowed position into the display position by means of a spring force in case the locking means are disengaged,
    wherein the positioning means comprise a linear guidance with two gear racks, one at each lateral side of the combiner, which combiner is attached to a support shaft connecting two gear wheels arranged at the ends of the support shaft and built to engage with the gear racks to move the combiner along a length axis of the linear guidance,
    wherein the positioning means comprise a damper attached at the support shaft and built to damp the movement of the spring means, and
    wherein the combiner is built to be moved manually from the display position into the stowed position, wherein in the stowed position the combiner is built to lock into place by engaging the locking means.

12. The head-up display according to claim 11, wherein the linear guidance and its length axis are built to be pivoted about a hinge axis arranged at a first end of the linear guidance.

13. The head-up display according to claim 12, wherein a pivot angle of the linear guidance is adjustable via manual adjustment means, in particular comprising an adjustment wheel.

14. The head-up display according to claim 13, wherein the adjustment means comprise an eccentric camwheel, wherein the linear guidance is built to be pivoted by means of the camwheel and a first pin attached to a carrier of the combiner and guided in the linear guidance, wherein rotation of the camwheel moves the first pin in an essentially orthogonal direction (G) as compared to the length axis of the linear guidance.

15. The system according to claim 13, wherein the adjustment of the linear guidance remains constant during the movement of the combiner between the stowed position and the display position.

16. The head-up display according to claim 14, further comprising at least one spring built to press the linear guidance to the camwheel.

17. The system according to claim 16, wherein the positioning means comprise a damper, in particular a silicon oil damper, built to damp the movement of the spring means.

18. The head-up display according to claim 17, wherein the positioning means comprise a coupling element built to couple/de-couple the damper to and from the support shaft to enable a damped/un-damped movement of the combiner.

* * * * *